United States Patent
Wei

(10) Patent No.: US 10,063,338 B2
(45) Date of Patent: Aug. 28, 2018

(54) OPTICAL ADD/DROP MULTIPLEXER AND OPTICAL NETWORK SIGNAL TRANSMISSION METHOD

(71) Applicant: Huawei Technologies Co., Ltd., Shenzhen (CN)

(72) Inventor: Wenxiong Wei, Hangzhou (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 15/582,290

(22) Filed: Apr. 28, 2017

(65) Prior Publication Data
US 2017/0237517 A1 Aug. 17, 2017

Related U.S. Application Data

(63) Continuation of application No. PCT/CN2014/089792, filed on Oct. 29, 2014.

(51) Int. Cl.
*H04J 14/02* (2006.01)
*H04B 10/27* (2013.01)

(52) U.S. Cl.
CPC .......... *H04J 14/0215* (2013.01); *H04B 10/27* (2013.01); *H04J 14/0202* (2013.01)

(58) Field of Classification Search
CPC ............ G02B 6/12007; G02B 6/29383; G02B 2006/12147; H04J 14/02; H04J 14/021;
(Continued)

(56) References Cited

U.S. PATENT DOCUMENTS 6,532,106 B2 * 3/2003 Chung ............... H01S 3/06754
359/337.1
6,751,372 B2 6/2004 Feuer et al.
(Continued)

FOREIGN PATENT DOCUMENTS

CN 1428960 A 7/2003
CN 1470111 A 1/2004
(Continued)

OTHER PUBLICATIONS

El-Ganainy et al., "On-Chip Multi 4-Port Optical Circulators," IEEE Photonics Journal, vol. 6, No. 1, Institute of Electrical and Electronics Engineers, Houghton, Michigan (Feb. 2014).

*Primary Examiner* — Don N Vo
(74) *Attorney, Agent, or Firm* — Leydig, Voit & Mayer, Ltd.

(57) ABSTRACT

The present disclosure relates to the field of communications technologies, and in particular, to an optical add/drop multiplexer, such that the optical add/drop multiplexer can ensure proper processing of light in two directions. The optical add/drop multiplexer can complete an extraction of a signal in one direction using one microring resonant cavity and two optical circulators, and if a wavelength of a signal in the other direction is the same as a resonant wavelength of the microring resonant cavity, the signal may reenter an optical network after passing through two microring resonant cavities and one optical circulator, and is not affected. Therefore, proper processing of optical signals in the two directions is ensured, and the optical signals in the two directions do not interfere with each other.

12 Claims, 10 Drawing Sheets

(58) Field of Classification Search
CPC .............. H04J 14/0212; H04J 14/0201; G02F 2203/585
USPC ........................................................ 398/83
See application file for complete search history.

(56) References Cited

U.S. PATENT DOCUMENTS

| | | | |
|---|---|---|---|
| 6,928,209 | B2 | 8/2005 | Su et al. |
| 7,110,674 | B2 | 9/2006 | Nakajima et al. |
| 8,761,553 | B2 | 6/2014 | Park et al. |
| 2002/0039213 | A1 | 4/2002 | Duerksen |
| 2002/0039470 | A1 | 4/2002 | Braun et al. |
| 2004/0091272 | A1 | 5/2004 | Liu et al. |
| 2004/0247227 | A1 | 12/2004 | Eder et al. |
| 2005/0084262 | A1 | 4/2005 | Oberg et al. |
| 2007/0104421 | A1* | 5/2007 | Henriksson ........ G02B 6/02095 385/37 |
| 2008/0129997 | A1 | 6/2008 | Yi et al. |
| 2008/0193133 | A1 | 8/2008 | Krug et al. |
| 2009/0226129 | A1* | 9/2009 | Kuipers ................ G02F 1/3132 385/14 |
| 2013/0223805 | A1 | 8/2013 | Ouyang et al. |
| 2013/0302659 | A1 | 11/2013 | Terada et al. |
| 2017/0019168 | A1* | 1/2017 | Menard .............. G02B 6/29395 |

FOREIGN PATENT DOCUMENTS

| | | |
|---|---|---|
| CN | 101813805 A | 8/2010 |
| CN | 101840028 A | 9/2010 |
| CN | 102711000 A | 10/2012 |
| JP | H05100254 A | 4/1993 |
| JP | 2005513861 A | 5/2005 |
| JP | 2006035520 A | 2/2006 |
| JP | 4168778 B2 | 10/2008 |
| JP | 2010511872 A | 4/2010 |
| JP | 2011108617 A | 6/2011 |
| WO | 2007014218 A2 | 2/2007 |
| WO | 2008055527 A1 | 5/2008 |

\* cited by examiner

OPTICAL ADD/DROP MULTIPLEXER AND OPTICAL NETWORK SIGNAL TRANSMISSION METHOD

CROSS-REFERENCE TO RELATED APPLICATIONS

This application is a continuation of International Application No. PCT/CN2014/089792, filed on Oct. 29, 2014, the disclosure of which is hereby incorporated by reference in its entirety.

TECHNICAL FIELD

The embodiments of the present disclosure relate to the field of optical communications technologies, and in particular, to an optical add/drop multiplexer and an optical network signal transmission method.

BACKGROUND

An optical add/drop multiplexer (OADM) is configured to multiplex and route, in a wavelength division multiplexing (WDM) optical network, optical signals on different channels. The optical add/drop multiplexer is located on an optical network node, and the optical network node exchanges data with the WDM optical network using the optical add/drop multiplexer.

In the prior art, it is currently proposed that a microring resonant cavity is used as the optical add/drop multiplexer. For details, refer to FIG. 1.

As shown in FIG. 1, 28a and 28b are two optical waveguides, 26 is a microring resonant cavity, and a transmission direction of an optical signal in the microring resonant cavity is a counterclockwise direction. The waveguide 28a is connected to an optical network, and an optical signal is transmitted from right to left in the waveguide 28a. In an area in which the waveguide 28a is coupled with the microring resonant cavity, an optical signal that has a same wavelength as a resonant wavelength of the microring resonant cavity is extracted, and enters the waveguide 28b by passing through the microring resonant cavity. A transmission direction of the optical signal in the waveguide 28b is from left to right, and an extraction of the optical signal is completed. However, an optical signal that has a different wavelength from the resonant wavelength of the microring resonant cavity is not affected, and is still transmitted from right to left in the waveguide 28a. The waveguide 28b is connected to an optical network node on which the optical add/drop multiplexer is located, which is equivalent to that the waveguide 28b is connected to a local optical network node. An optical signal that needs to be inserted is transmitted from left to right in the waveguide 28b, and an optical signal that has a same wavelength as the resonant wavelength of the microring resonant cavity enters the waveguide 28a by passing through the microring resonant cavity. A transmission direction of the optical signal in the waveguide 28a is from right to left, and an insertion of the optical signal is completed.

The extraction means that an optical network signal in the optical network is downloaded to the optical network node on which the optical add/drop multiplexer is located; and the insertion means that an optical network signal on the optical network node on which the optical add/drop multiplexer is located is uploaded to the optical network.

A disadvantage in the prior art is that the optical add/drop multiplexer supports normal operation only in a single direction. As shown in FIG. 1, when an optical signal in the waveguide 28a is transmitted from right to left, it can be only set that, in the waveguide 28b, an inserted optical signal enters from the left, and an extracted optical signal goes out from the right. However, this setting further causes a limitation that transmission of an optical signal from left to right is not supported in the waveguide 28a; otherwise, an optical signal in this direction is also extracted by the microring resonant cavity.

A scenario is considered: Referring to FIG. 2A, for example, there are three optical network nodes: a node 1, a node 2, and a server node 3. The node 1, the node 2, and the server node 3 implement optical communication using an optical waveguide 4. Therefore, optical network signals in two directions need to be transmitted in the optical waveguide 4. For example, the optical add/drop multiplexer shown in FIG. 1 is disposed on the node 2, and therefore an optical network signal that is sent by the server node 3 to the node 2 and has a specific wavelength may be extracted by the optical add/drop multiplexer on the node 2. However, if optical network signals sent by the node 1 to the server node 3 also include an optical network signal having the specific wavelength, the optical add/drop multiplexer on the node 2 also extracts the optical network signal that is sent by the node 1 to the server node 3 and has the specific wavelength. As a result, the server node 3 cannot receive the optical network signal, thereby affecting a normal service processing process.

It can be learned that the optical add/drop multiplexer in the prior art supports optical signal transmission only in a single direction, which is likely to affect normal optical communication.

SUMMARY

Embodiments of the present disclosure provide an optical add/drop multiplexer and an optical network signal transmission method, so as to resolve a technical problem that the optical add/drop multiplexer supports optical signal transmission only in a single direction.

According to a first aspect of the embodiments of the present disclosure, an optical add/drop multiplexer is provided, including:

a first microring resonant cavity (302), coupled with a first side of a first waveguide (301) in an optical network, and configured to receive, from the first waveguide (301), a first optical network signal whose wavelength is a first wavelength;

a second microring resonant cavity (303), coupled with the first side of the first waveguide (301), and configured to receive the first optical network signal transmitted by the first microring resonant cavity (302), and transmit the first optical network signal to the first waveguide (301), where a transmission direction of the first optical network signal in the first waveguide (301) is a first direction; and configured to receive, from the first waveguide (301), a second optical network signal whose wavelength is the first wavelength and whose transmission direction in the first waveguide (301) is a second direction, where the first wavelength is a resonant wavelength of the first microring resonant cavity (302) and the second microring resonant cavity (303), the second direction is a specified direction of a to-be-processed optical network signal transmitted in the first waveguide (301), and the second direction is opposite to the first direction;

a first optical circulator (305), where a first end (a) of the first optical circulator (305) is connected to one end of a second waveguide (304), and a second end (b) of the first optical circulator (305) is connected to one end of a third waveguide (306); configured to transmit, to the second microring resonant cavity (303), the first optical network signal transmitted by the first microring resonant cavity (302), and to receive the second optical network signal transmitted by the second microring resonant cavity (303); where the other end of the second waveguide (304) is coupled with the first microring resonant cavity (302); and the other end of the third waveguide (306) is coupled with the second microring resonant cavity (303); and a second optical circulator (308), where a third end (f) of the second optical circulator (308) is connected to a third end (c) of the first optical circulator (305) using a fourth waveguide (307), and a first end (d) of the second optical circulator (308) is connected to one end of a fifth waveguide (309); configured to receive the second optical network signal transmitted by the first optical circulator (305), and extract and distribute, using the fifth waveguide (309), the second optical network signal to an optical network node on which the optical add/drop multiplexer is located.

With reference to the first aspect, in a first possible implementation manner of the first aspect, the optical add/drop multiplexer further includes a sixth waveguide (401), which is connected to a second end (e) of the second optical circulator (308), and configured to transmit, to the second optical circulator (308), a third optical network signal that is to be inserted into the first waveguide (301) and whose wavelength is the first wavelength;

the second optical circulator (308) is further configured to receive the third optical network signal from the sixth waveguide (401), and transmit the third optical network signal to the first optical circulator (305);

the first optical circulator (305) is further configured to receive the third optical network signal transmitted by the second optical circulator (308), and transmit the third optical network signal to the first microring resonant cavity (302) using the second waveguide (304); and the first microring resonant cavity (302) is further configured to receive the third optical network signal transmitted by the first optical circulator (305), and transmit the third optical network signal to the first waveguide (301), where a transmission direction of the third optical network signal in the first waveguide (301) is the second direction.

With reference to the first aspect or the first possible implementation manner of the first aspect, in a second possible implementation manner of the first aspect, the optical add/drop multiplexer further includes an optical detector (501), which is connected to an end at which the second waveguide (304) is coupled with the first microring resonant cavity (302), and configured to receive an optical network signal that is from the second optical circulator (308) and whose wavelength is the first wavelength, when the resonant wavelength of the first microring resonant cavity (302) deviates from the first wavelength.

With reference to the second possible implementation manner of the first aspect, in a third possible implementation manner of the first aspect, the optical detector (501) is a photomultiplier, a pyroelectric detector, or a semiconductor optical detector.

With reference to any one of the first aspect, or the first to the third possible implementation manners of the first aspect, in a fourth possible implementation manner of the first aspect, there are multiple first microring resonant cavities (302); where the multiple first microring resonant cavities (302) are arranged in a column, whose ends are separately coupled, a first microring resonant cavity (302) arranged in the first place is coupled with the first side of the first waveguide (301), and a first microring resonant cavity (302) arranged in the last place is coupled with the second waveguide (304).

With reference to any one of the first aspect, or the first to the fourth possible implementation manners of the first aspect, in a fifth possible implementation manner of the first aspect, there are multiple second microring resonant cavities (303); where the multiple second microring resonant cavities (303) are arranged in a column, whose ends are separately coupled, a second microring resonant cavity (303) arranged in the first place is coupled with the first side of the first waveguide (301), and a second microring resonant cavity (303) arranged in the last place is coupled with the third waveguide (306).

With reference to any one of the first aspect, or the first to the fifth possible implementation manners of the first aspect, in a sixth possible implementation manner of the first aspect, the optical network is a wavelength division multiplexing WDM optical network.

According to a second aspect of the embodiments of the present disclosure, an optical network signal transmission method is provided, including:

receiving, using a first microring resonant cavity (302) in an optical add/drop multiplexer, a first optical network signal transmitted by a first waveguide (301) in an optical network, where the first microring resonant cavity (302) is coupled with a first side of the first waveguide (301), a wavelength of the first optical network signal is a first wavelength, and a transmission direction of the first optical network signal in the first waveguide (301) is a first direction;

receiving, using a first optical circulator (305) in the optical add/drop multiplexer, the first optical network signal transmitted by the first microring resonant cavity (302) using a second waveguide (304), where the first optical circulator (305) is connected to one end of the second waveguide (304), and the other end of the second waveguide (304) is coupled with the first microring resonant cavity (302);

receiving, using a second microring resonant cavity (303) in the optical add/drop multiplexer, the first optical network signal transmitted by the first optical circulator (305) using a third waveguide (306), where the first optical circulator (305) is connected to one end of the third waveguide (306), the other end of the third waveguide (306) is coupled with the second microring resonant cavity (303), and the first wavelength is a resonant wavelength of the first microring resonant cavity (302) and the second microring resonant cavity (303);

retransmitting the first optical network signal to the first waveguide (301) using the second microring resonant cavity (303), such that an optical network signal in the first direction is transmitted in the first waveguide (301);

receiving, using the second microring resonant cavity (303), a second optical network signal transmitted by the first waveguide (301), and transmitting the second optical network signal to the first optical circulator (305) using the third waveguide (306), where a wavelength of the second optical network signal is the first wavelength, a transmission direction of the second optical network signal in the first waveguide (301) is a second direction, the second direction is a specified direction of a to-be-processed optical network signal transmitted in the first waveguide (301), and the second direction is opposite to the first direction;

receiving, using the first optical circulator (305), the second optical network signal transmitted by the second microring resonant cavity (303), and transmitting the second optical network signal to a second optical circulator (308) in the optical add/drop multiplexer; and receiving, using the second optical circulator (308), the second optical network signal transmitted by the first optical circulator (305), and extracting and distributing, using a fifth waveguide (309) connected to a first end of the second optical circulator (308), the second optical network signal to an optical network node on which the optical add/drop multiplexer is located, where a third end of the second optical circulator (308) is connected to one end of a fourth waveguide (307), and the other end of the fourth waveguide (307) is connected to a third end of the first optical circulator (305).

With reference to the second aspect, in a first possible implementation manner of the second aspect, the method further includes:

receiving a third optical network signal from the optical network node using the second optical circulator (308), where the third end of the second optical circulator (308) is connected to the one end of the fourth waveguide (307), the other end of the fourth waveguide (307) is connected to the third end of the first optical circulator (305), a second end of the second optical circulator (308) is connected to a sixth waveguide (401), and the sixth waveguide (401) is configured to transmit the local third optical network signal to the second optical circulator (308);

receiving, using the first optical circulator (305), the third optical network signal transmitted by the second optical circulator (308), and transmitting the third optical network signal to the second waveguide (304); and if a resonant wavelength of the first microring resonant cavity (302) is the first wavelength, receiving, by the first microring resonant cavity (302), the third optical network signal transmitted by the second waveguide (304), and transmitting the first optical network signal to the first waveguide (301), where a transmission direction of the third optical network signal in the first waveguide (301) is the second direction.

With reference to the first possible implementation manner of the second aspect, in a second possible implementation manner of the second aspect, after the transmitting the third optical network signal to the second waveguide (304), the method further includes:

if the resonant wavelength of the first microring resonant cavity (302) is not the first wavelength, receiving, using an optical detector (501) in the optical add/drop multiplexer, the third optical network signal transmitted by the first waveguide (301), where the optical detector (501) is connected to an end at which the second waveguide (304) is coupled with the first microring resonant cavity (302).

In the embodiments of the present disclosure, the second direction is a specified transmission direction of a to-be-processed optical network signal, that is, the optical add/drop multiplexer needs to insert or extract an optical network signal transmitted in the second direction. However, for an optical network signal in the first direction, normal transmission should be ensured. Specifically, if optical network signals transmitted in the first direction have a first optical network signal whose wavelength is the first wavelength, the first microring resonant cavity 302 receives the first optical network signal from the first waveguide 301, and transmits the first optical network signal to the second microring resonant cavity 303 using the first optical circulator 305; the second microring resonant cavity 303 retransmits the first optical network signal to the first waveguide 301 in a coupling manner, and the first optical network signal continues to be transmitted in the first waveguide 301 in the first direction. However, if optical network signals transmitted in the second direction have a second optical network signal whose wavelength is the first wavelength, the second microring resonant cavity 303 receives the second optical network signal, and extracts and distributes, using the second optical circulator 308 and the first optical circulator 305, the second optical network signal to the optical network node on which the optical add/drop multiplexer is located. That is, after passing through the optical add/drop multiplexer, an optical network signal in the first direction is not extracted, and can be still normally transmitted; however, an optical network signal in the second direction can be extracted and distributed to the optical network node, thereby ensuring not only normal extraction operation of the optical add/drop multiplexer but also that when inserting or extracting an optical signal in one direction, the optical add/drop multiplexer can support normal transmission of an optical signal in the other direction, such that all optical network signals transmitted in two directions can be properly processed, so as to ensure normal optical communication.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the embodiments of the present disclosure.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

The following further describes the embodiments of the present disclosure in detail with reference to the accompanying drawings of this specification.

Figure 1:
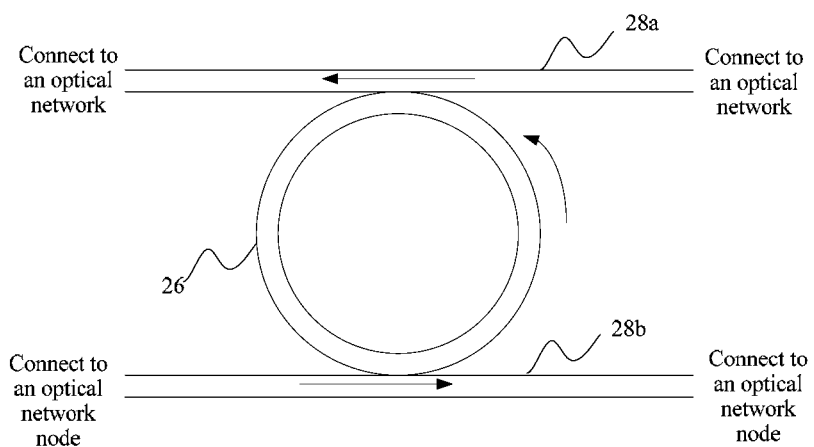
FIG. 1 is a schematic diagram of an optical add/drop multiplexer in the prior art.
Figure 2A:
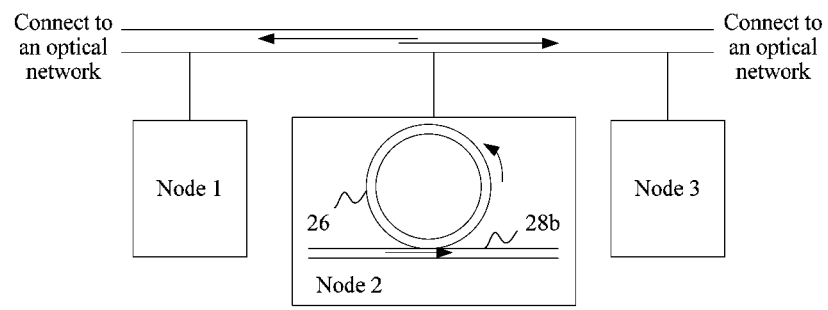
FIG. 2A is a schematic diagram of an optical communication application scenario in the prior art.
Figure 2B:
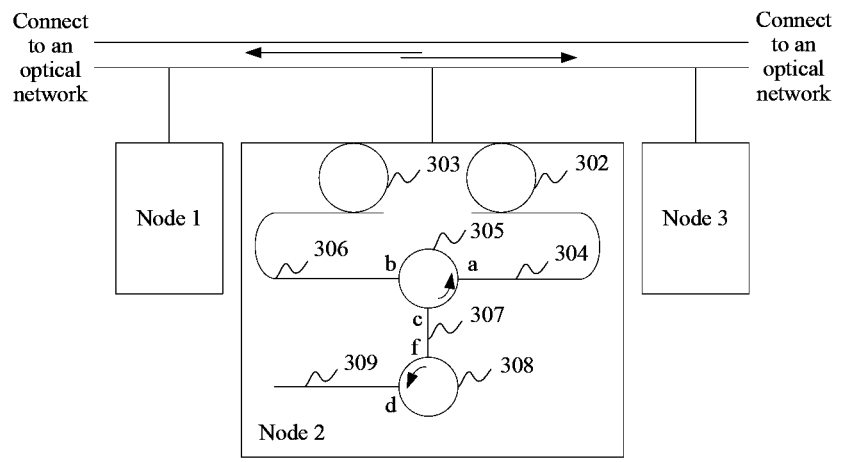
FIG. 2B is a schematic diagram of an optical communication application scenario according to an embodiment of the present disclosure.

Referring to FIG. 2B first, in the network structure of FIG. 2A that continues to be used as an example, for example, there are three optical network nodes: a node 1, a node 2, and a server node 3. The node 1, the node 2, and the server node 3 implement optical communication using an optical waveguide 4. Therefore, optical network signals in two directions need to be transmitted in the optical waveguide 4. However, what is different from FIG. 2A is that an optical add/drop multiplexer disposed on the node 2 in FIG. 2B is not the optical add/drop multiplexer in the prior art but an optical add/drop multiplexer provided in an embodiment of the present disclosure. Therefore, an optical network signal that is sent by the server node 3 to the node 2 and has a specific wavelength may be extracted by the optical add/drop multiplexer on the node 2. For example, optical network signals sent by the node 1 to the server node 3 also include an optical network signal having the specific wavelength, and the optical add/drop multiplexer in this embodiment of the present disclosure disposed on the node 2 does not extract the optical network signal that is sent by the node 1 to the server node 3 and has the specific wavelength, which can be normally received by the server node 3. Therefore, normal optical signal transmission is ensured, and a normal service processing process is not affected as much as possible.

FIG. 2B may be considered as a possible application scenario of an embodiment of the present disclosure. The following describes the optical add/drop multiplexer in this embodiment of the present disclosure in detail with reference to the accompanying drawings, that is, the optical add/drop multiplexer disposed on the node 2 in FIG. 2B.

Figure 3:
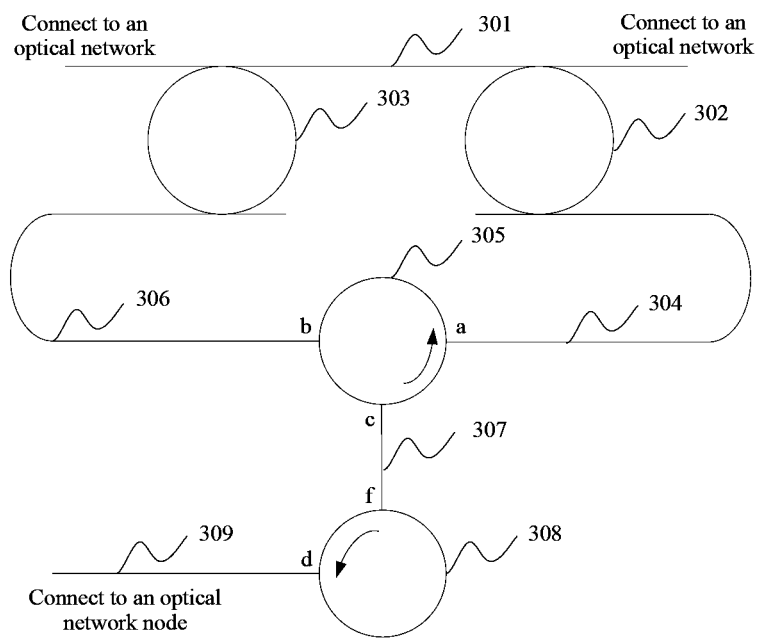
FIG. 3 is a schematic diagram of a main structure of an optical add/drop multiplexer according to an embodiment of the present disclosure.

Referring to FIG. 3, based on a same disclosure concept, an embodiment of the present disclosure provides an optical add/drop multiplexer. The optical add/drop multiplexer may include a first microring resonant cavity 302, a second microring resonant cavity 303, a second waveguide 304, a first optical circulator 305, a third waveguide 306, a fourth waveguide 307, a second optical circulator 308, and a fifth waveguide 309.

A first waveguide 301 in FIG. 3 belongs to an optical network, which is also indicated in FIG. 3 that the first waveguide 301 is connected to the optical network.

The first microring resonant cavity 302 is coupled with a first side of the first waveguide 301 that is in the optical network and that is configured to transmit an optical network signal; and is configured to receive, from the first waveguide 301, an optical network signal whose wavelength is a first wavelength. The optical network signal herein is referred to as a first optical network signal. A resonant wavelength of the first microring resonant cavity 302 is the first wavelength. Therefore, the first microring resonant cavity 302 can receive the first optical network signal from the first waveguide 301 in a coupling manner.

The second microring resonant cavity 303 is also coupled with the first side of the first waveguide 301, that is, the first microring resonant cavity 302 and the second microring resonant cavity 303 are located on a same side of the first waveguide 301. The second microring resonant cavity 303 is configured to receive the first optical network signal transmitted by the first microring resonant cavity 302, and may retransmit the first optical network signal to the first waveguide 301, where a transmission direction of the first optical network signal in the first waveguide 301 is always a first direction. In addition, the second microring resonant cavity 303 may further receive, from the first waveguide 301, an optical network signal whose wavelength is also the first wavelength and whose transmission direction in the first waveguide 301 is a second direction. The optical network signal herein is referred to as a second optical network signal, the second direction is opposite to the first direction, and the second direction is a specified direction of a to-be-processed optical network signal transmitted in the first waveguide 301, that is, processing such as an extraction may be performed on an optical network signal in the second direction. However, regarding a signal in the first direction, normal transmission of the signal in the first waveguide 301 needs to be ensured, and the signal is not extracted or distributed to an optical network node on which the optical add/drop multiplexer is located.

A resonant wavelength of the second microring resonant cavity 303 is also the first wavelength. Therefore, the second microring resonant cavity 303 can receive the first optical network signal, and may transmit the first optical network signal to the first waveguide 301 in a coupling manner; and the second microring resonant cavity 303 can receive the second optical network signal from the first waveguide 301 in a coupling manner.

One end of the second waveguide 304 is coupled with the first microring resonant cavity 302, and the other end of the second waveguide 304 is connected to a first end a of the first optical circulator 305.

A second end b of the first optical circulator 305 is connected to one end of the third waveguide 306, and the other end of the third waveguide 306 is coupled with the second microring resonant cavity 303. A third end c of the first optical circulator 305 is connected to one end of the fourth waveguide 307, and the other end of the fourth waveguide 307 is connected to a third end f of the second optical circulator 308. The first optical circulator 305 is configured to transmit, to the second microring resonant cavity 303, the first optical network signal transmitted by the first microring resonant cavity 302, that is, the first microring resonant cavity 302 receives the first optical network signal from the first waveguide 301 in a coupling manner, and transmits the first optical network signal to the first optical circulator 305 using the second waveguide 304. The first optical network signal enters from the first end a of the first optical circulator 305, goes out from the second end b of the first optical circulator 305, reaches the second microring resonant cavity 303 by passing through the third waveguide 306, and then, is transmitted to the first waveguide 301 by coupling the second microring resonant cavity 303 with the first waveguide 301.

Before the first optical network signal is received by the first microring resonant cavity 302, the transmission direction of the first optical network signal in the first waveguide 301 is the first direction. After the first optical network signal is received by the first microring resonant cavity 302, and is retransmitted to the first waveguide 301 using the second waveguide 304, the first optical circulator 305, the third waveguide 306, and the second microring resonant cavity 303, the transmission direction is still the first direction. It can be learned that, after passing through the optical add/drop multiplexer, optical network signals that have various wavelengths and that are included in optical network signals in a specified direction in which no processing should be performed are not lost, and are still normally transmitted in an original direction, which is not affected.

In addition, the first optical circulator 305 is further configured to receive the second optical network signal transmitted by the second microring resonant cavity 303. The second optical network signal enters from the second end b of the first optical circulator 305, goes out from the third end c of the first optical circulator 305, and enters the second optical circulator 308 using the fourth waveguide 307.

A first end d of the second optical circulator 308 is connected to one end of the fifth waveguide 309. The second optical circulator 308 is configured to receive the second optical network signal transmitted by the first optical circulator 305, and extracts the second optical network signal locally using the fifth waveguide 309. The second optical network signal enters from the third end f of the second optical circulator 308, goes out from the first end d of the second optical circulator 308, and is extracted locally by passing through the fifth waveguide 309. In FIG. 3, transmission directions of optical signals in the first optical circulator 305 and the second optical circulator 308 are both counterclockwise directions, which are used as an example and are shown as arrows in the first optical circulator 305 and the second optical circulator 308 in FIG. 3.

The other end of the fifth waveguide 309 is connected to the optical network node, that is, the optical network node on which the optical add/drop multiplexer is located. It may be considered that the other end of the fifth waveguide 309 is locally connected.

It can be learned that after passing through the optical add/drop multiplexer, an optical network signal that should not be processed in the first direction is not extracted, and can be still normally transmitted; however, a specified optical network signal that needs to be processed in the second direction can be extracted locally, that is, extracted and distributed to the optical network node on which the optical add/drop multiplexer is located, thereby ensuring not only normal extraction operation of the optical add/drop multiplexer but also that when inserting or extracting an optical signal in one direction, the optical add/drop multiplexer can support normal transmission of an optical signal in the other direction, such that all optical network signals transmitted in two directions can be properly processed without mutual interference.

Figure 4:
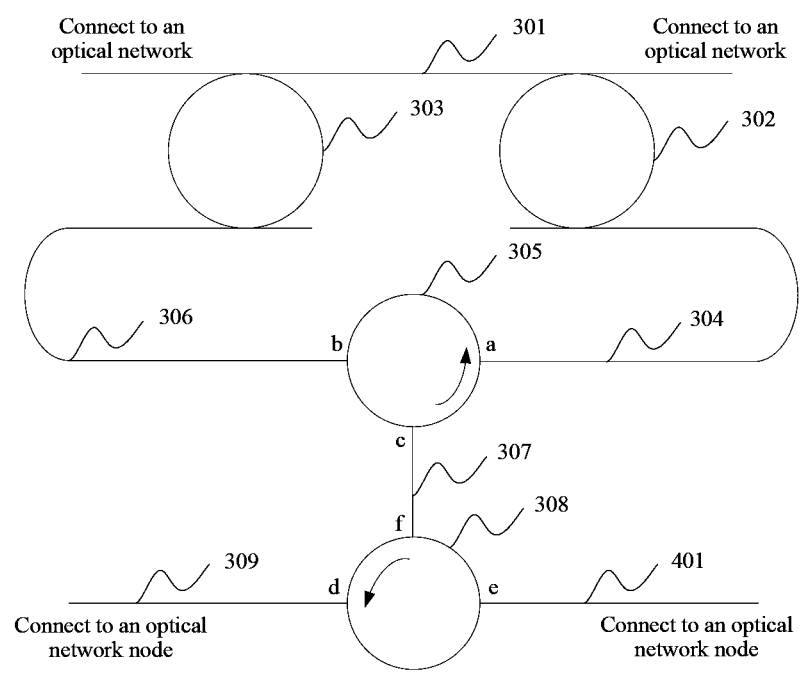
FIG. 4 is a schematic diagram of a detailed structure of an optical add/drop multiplexer according to an embodiment of the present disclosure.

Optionally, referring to FIG. 4, in this embodiment of the present disclosure, a second end e of the second optical circulator 308 may be further connected to a sixth waveguide 401, and the sixth waveguide 401 is configured to transmit, to the second optical circulator 308, a third optical network signal that is to be inserted into the first waveguide 301, where a wavelength of the third optical network signal is also the first wavelength. Only an optical network signal that has a same wavelength as a resonant wavelength of a corresponding microring resonant cavity can be extracted or inserted.

The second optical circulator 308 is further configured to receive the third optical network signal from the sixth waveguide 401, and transmit the third optical network signal to the first optical circulator 305. The third optical network signal enters from the second end e of the second optical circulator 308, and goes out from the third end f of the second optical circulator 308.

The first optical circulator 305 is further configured to receive the third optical network signal transmitted by the second optical circulator 308, and transmit the third optical network signal to the first microring resonant cavity 302 using the second waveguide 304. The third optical network signal enters from the third end c of the first optical circulator 305, and goes out from the first end a of the first optical circulator 305.

The first microring resonant cavity 302 is further configured to receive the third optical network signal transmitted by the first optical circulator 305, and transmit the third optical network signal to the first waveguide 301 in a coupling manner. After the third optical network signal is transmitted to the first waveguide 301, a transmission direction of the third optical network signal in the first waveguide 301 is the second direction.

That is, the to-be-inserted third optical network signal enters the second end e of the second optical circulator 308 using the sixth waveguide 401, goes out from the third end f of the second optical circulator 308, enters the third end c of the first optical circulator 305, goes out from the first end a of the first optical circulator 305, and enters the first microring resonant cavity 302 by passing through the second waveguide 304, and the first microring resonant cavity 302 transmits the third optical network signal to the first waveguide 301 in a coupling manner. Therefore, an insertion of the optical network signal is completed.

It can be learned that, in this embodiment of the present disclosure, both an insertion and an extraction of an optical network signal can be normally performed, and signals in two transmission directions do not interfere with each other.

For example, as shown in FIG. 4, resonant wavelengths of two microring resonant cavities are set to $\lambda 3$, that is, the first wavelength is $\lambda 3$. Optical transmission directions of two optical circulators are counterclockwise directions. The first direction is set to a right-to-left direction in the first waveguide 301, and the second direction is a left-to-right direction in the first waveguide 301.

Therefore, for optical network signals transmitted from left to right in the first waveguide 301, an optical network signal whose wavelength is $\lambda 3$ is extracted by the second microring resonant cavity 303, and enters an extraction end of the optical add/drop multiplexer by passing through the first optical circulator 305 and the second optical circulator 308, that is, enters the fifth waveguide 309; however, an optical network signal having another wavelength is not affected by the second microring resonant cavity 303 and the first microring resonant cavity 302, and continues to be transmitted in the first waveguide 301, that is, directly passes through the optical add/drop multiplexer.

For optical network signals transmitted from right to left in the first waveguide 301, an optical network signal whose wavelength is $\lambda 3$ is extracted by the first microring resonant cavity 302, but after passing through the first optical circulator 305, the optical network signal reenters the network by passing through the second microring resonant cavity 303, that is, enters the first waveguide 301, thereby avoiding damage caused by the optical add/drop multiplexer on the optical network signal that is transmitted in a right-to-left direction and whose wavelength is $\lambda 3$; however, an optical network signal having another wavelength is not affected by the second microring resonant cavity 303 and the first microring resonant cavity 302, and continues to be transmitted in the first waveguide 301, that is, directly passes through the optical add/drop multiplexer.

During a signal insertion, an optical network signal whose wavelength is λ3 enters the optical add/drop multiplexer at an insertion end (that is, an end of the sixth waveguide 401), and is inserted into the network by the first microring resonant cavity 302 by passing through the second optical circulator 308 and the first optical circulator 305, that is, inserted into the first waveguide 301, and a transmission direction of the optical network signal is from left to right. An insertion process and an extraction process in this embodiment of the present disclosure may be simultaneously performed, and are not affected by each other.

Figure 5:
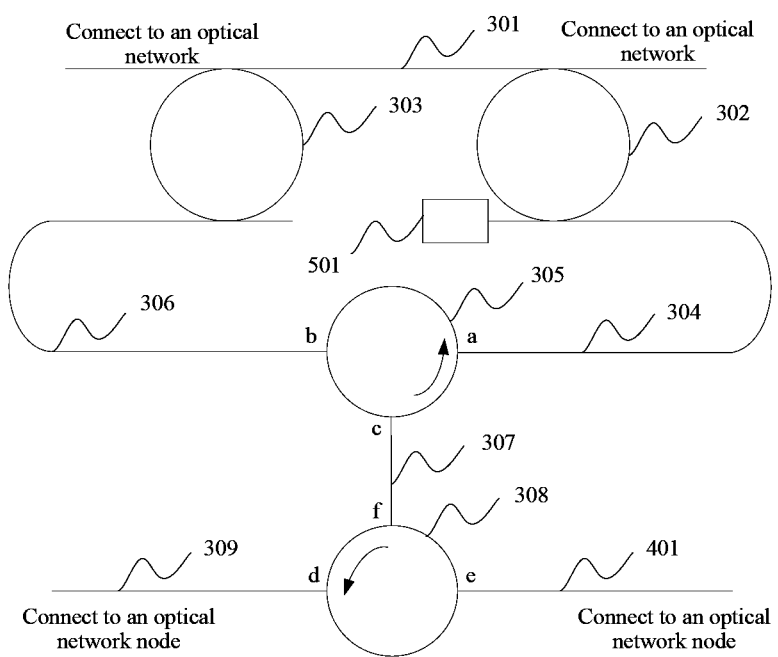
FIG. 5 is a schematic structural diagram of an optical add/drop multiplexer to which an optical detector is added according to an embodiment of the present disclosure.

In addition, considering that a silicon-based microring resonant cavity is sensitive to a temperature, in operation, a thermo-optic effect needs to be used to adjust resonant wavelengths of two microring resonant cavities. Optionally, this embodiment of the present disclosure provides a solution for this. As shown in FIG. 5, an optical detector 501 is connected to an end at which the second waveguide 304 is coupled with the first microring resonant cavity 302, and is configured to monitor an inserted optical network signal. The optical detector 501 is configured to: when the resonant wavelength of the first microring resonant cavity 302 deviates from the first wavelength, receive an optical network signal that is from the second optical circulator 308 and whose wavelength is the first wavelength.

It should be noted that shapes of the second waveguide 304 and the third waveguide 306 in FIG. 3 to FIG. 5 are all arcs, which are only drawings herein and do not represent actual shapes. Actual shapes of the second waveguide 304 and the third waveguide 306 may be arcs, or may be straight lines, which are not limited in the embodiments of the present disclosure.

Specifically, resonant wavelengths of the first microring resonant cavity 302 and the second microring resonant cavity 303 are λ3, which continues to be used as an example. When the optical add/drop multiplexer is being initialized or enters an operating state, light whose wavelength is λ3 is first incident at the insertion end. In this case, if the resonant wavelength of the first microring resonant cavity 302 deviates from λ3, for example, deviates to a second wavelength, this beam of light whose wavelength is λ3 is not inserted into the optical network, but received by the optical detector 501. Therefore, the resonant wavelength of the first microring resonant cavity 302 may be adjusted using the thermo-optic effect. When light detected by the optical detector 501 is reduced to zero, the resonant wavelength of the first microring resonant cavity 302 is adjusted to a proper resonant wavelength.

After the resonant wavelength of the first microring resonant cavity 302 is adjusted to the proper resonant wavelength (for example, λ3), the optical add/drop multiplexer enters the operating state. If the resonant wavelength of the second microring resonant cavity 303 also deviates from λ3, an optical network signal that is transmitted from left to right in the first waveguide 301 and whose wavelength is λ3 is not extracted by the second microring resonant cavity 303 but extracted by the first microring resonant cavity 302, and enters the optical detector 501 after being transmitted in a clockwise direction in the first microring resonant cavity 302. Therefore, the optical detector 501 may be used not only to adjust the resonant wavelength of the first microring resonant cavity 302 but also to adjust the resonant wavelength of the second microring resonant cavity 303. Therefore, only one optical detector 501 needs to be disposed, thereby saving a hardware resource.

Optionally, in this embodiment of the present disclosure, the optical detector 501 may be specifically a photomultiplier, a pyroelectric detector, a semiconductor optical detector, or the like.

Optionally, in this embodiment of the present disclosure, there may be one or more first microring resonant cavities 302, and there may be an even number or an odd number of first microring resonant cavities 302. In FIG. 3 to FIG. 5, there is one first microring resonant cavity 302, which is used as an example. If there are multiple first microring resonant cavities 302, the multiple first microring resonant cavities 302 are arranged in a column, whose ends are separately coupled, a first microring resonant cavity 302 arranged in the first place is coupled with the first side of the first waveguide 301, and a first microring resonant cavity 302 arranged in the last place is coupled with the second waveguide 304.

Figure 6A:
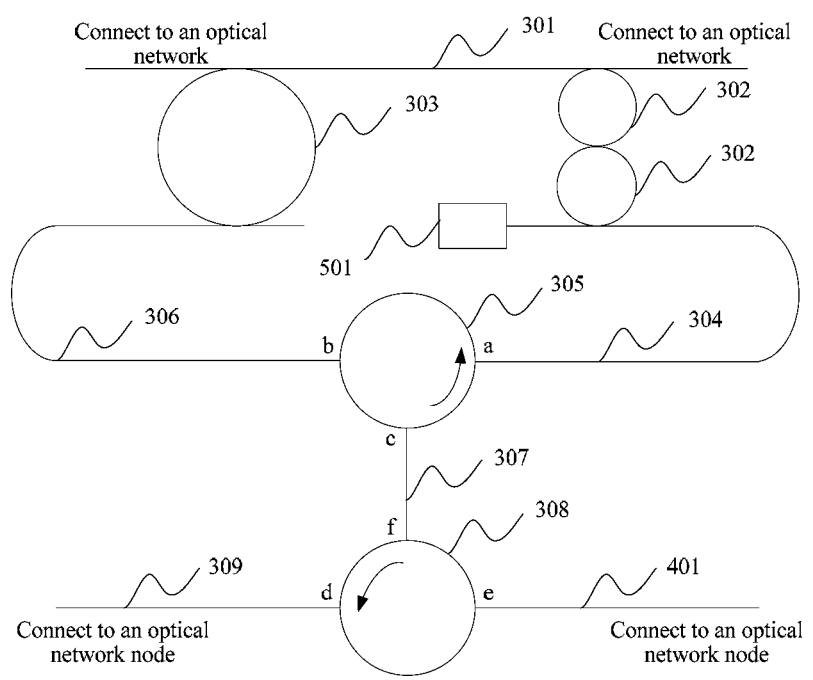
FIG. 6A is a schematic structural diagram of an optical add/drop multiplexer in which there are multiple first microring resonant cavities according to an embodiment of the present disclosure.

Referring to FIG. 6A, there are two first microring resonant cavities 302, which is used as an example.

Optionally, in this embodiment of the present disclosure, there may be one or more second microring resonant cavities 303, and there may be an even number or an odd number of second microring resonant cavities 303. In FIG. 3 to FIG. 5, there is one second microring resonant cavity 303, which is used as an example. If there are multiple second microring resonant cavities 303, the multiple second microring resonant cavities 303 are arranged in a column, whose ends are separately coupled, a second microring resonant cavity 303 arranged in the first place is coupled with the first side of the first waveguide 301, and a second microring resonant cavity 303 arranged in the last place is coupled with the third waveguide 306.

Figure 6B:
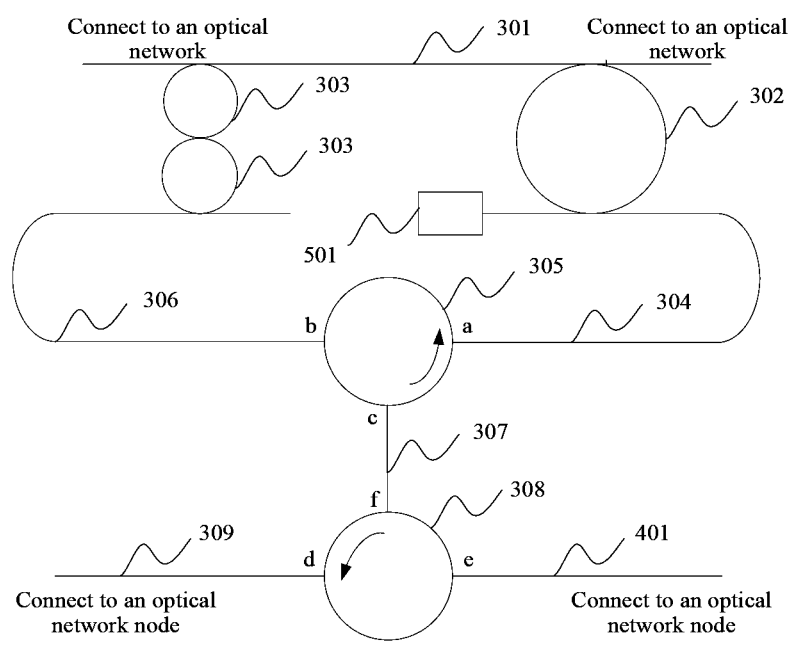
FIG. 6B is a schematic structural diagram of an optical add/drop multiplexer in which there are multiple second microring resonant cavities according to an embodiment of the present disclosure.

Referring to FIG. 6B, there are two second microring resonant cavities 303, which is used as an example.

In FIG. 6A and FIG. 6B, a size of the first microring resonant cavity 302 is different from that of the second microring resonant cavity 303, which is merely for ease of drawing and does not represent actual sizes of the first microring resonant cavity 302 and the second microring resonant cavity 303. That is, actually, the size of the first microring resonant cavity 302 may be the same as or different from that of the second microring resonant cavity 303, and this is not limited in this embodiment of the present disclosure. A person skilled in the art may understand that different variants in a specific implementation process of this embodiment of the present disclosure also fall within the protection scope of the embodiments of the present disclosure.

Figure 6C:
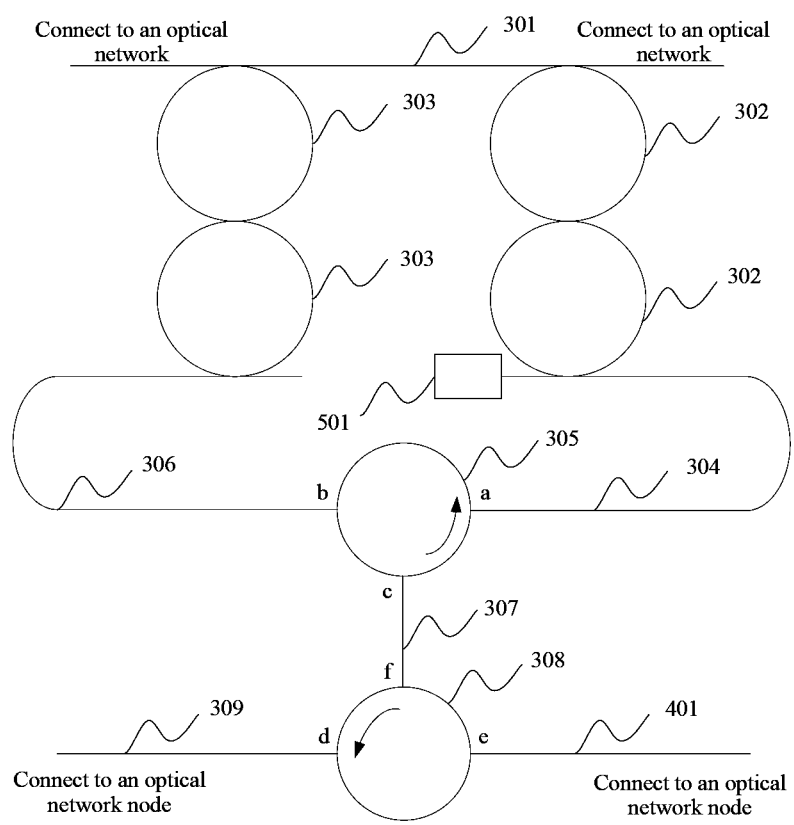
FIG. 6C is a schematic structural diagram of an optical add/drop multiplexer in which there are multiple first microring resonant cavities and multiple second microring resonant cavities according to an embodiment of the present disclosure.

Referring to FIG. 6C, there are two first microring resonant cavities 302 and two second microring resonant cavities 303, which is used as an example. It should be noted that a quantity of first microring resonant cavities 302 may be equal or not equal to a quantity of second microring resonant cavities 303. An example in which the quantities are not equal is used in FIG. 6A and FIG. 6B, and an example in which the quantities are equal is used in FIG. 6C, and FIG. 3 to FIG. 5.

If there is one microring resonant cavity, an insertion loss for the network is relatively low.

If there are multiple microring resonant cavities, a wavelength range of an extracted optical network signal is broader, that is, a wavelength passband is flatter, but another wavelength is not affected. In this way, it is easier to perform fine adjustment on a resonant wavelength of a microring resonant cavity.

In this embodiment of the present disclosure, whether the optical add/drop multiplexer includes how many microring resonant cavities, resonant wavelengths of entireties that include these microring resonant cavities need to be the same. That is, whether how many the quantity of first microring resonant cavities 302 and the quantity of second microring resonant cavities 303 are, if the first microring resonant cavities 302 and the second microring resonant cavities 303 are considered as two entireties, a resonant wavelength of the first microring resonant cavities 302 as an entirety needs to be the same as a resonant wavelength of the second microring resonant cavities 303 as an entirety.

Generally, during setting, whether how many the quantity of first microring resonant cavities 302 is, resonant wavelengths of all the first microring resonant cavities 302 may be set to be the same, which is also applicable to the second microring resonant cavities 303. That is, for the optical add/drop multiplexer, whether how many microring resonant cavities the optical add/drop multiplexer includes, resonant wavelengths of all the microring resonant cavities may be the same.

Optionally, in this embodiment of the present disclosure, the optical network may refer to a WDM optical network.

Figure 7A:
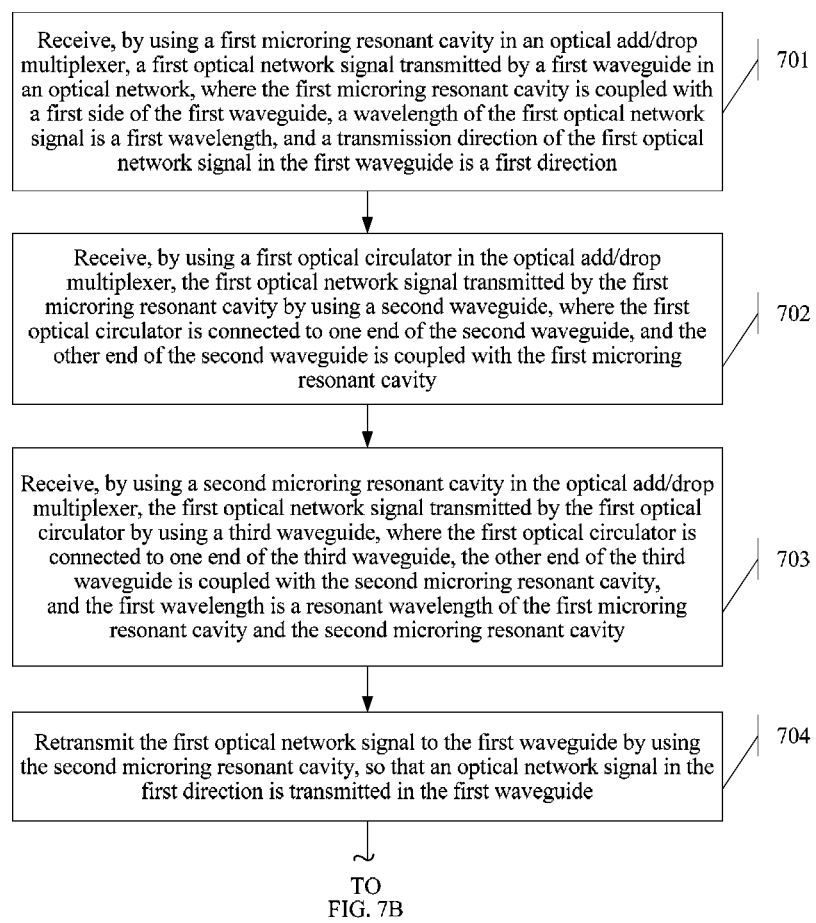
FIG. 7A and FIG. 7B are a flowchart of a main optical network signal transmission method according to an embodiment of the present disclosure.
Figure 7B:
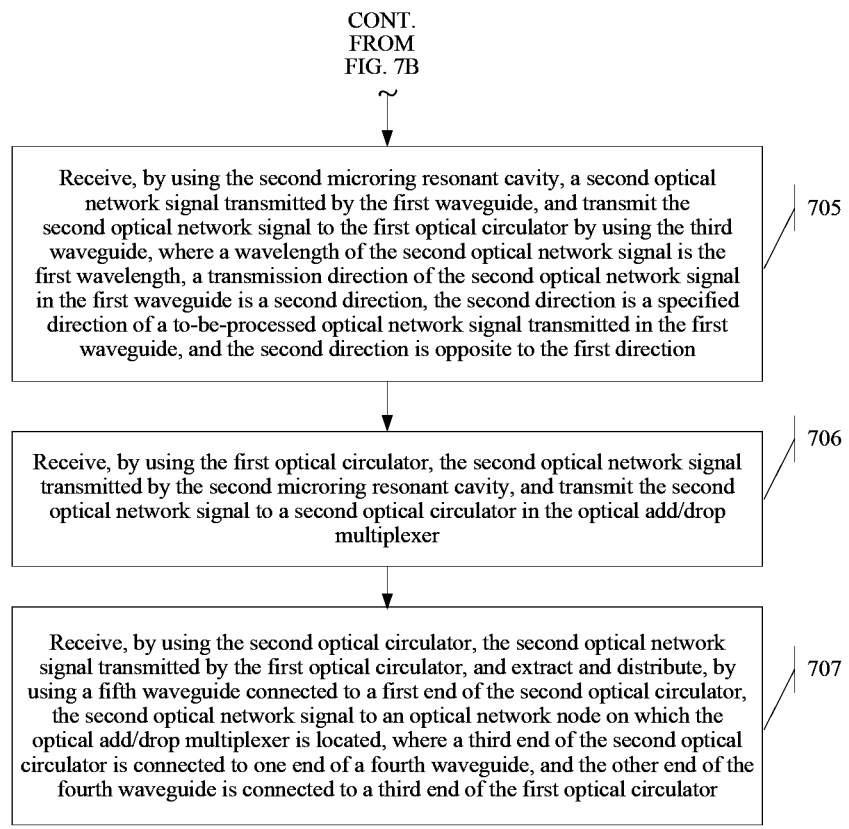

Referring to FIG. 7A and FIG. 7B, based on a same disclosure concept, an embodiment of the present disclosure provides an optical network signal transmission method. FIG. 7A and FIG. 7B show a method for transmitting an optical network signal using an optical add/drop multiplexer, and the optical add/drop multiplexer may be the optical add/drop multiplexer shown in FIG. 3 to FIG. 6C. Main processes of the method are described as follows:

Step 701: Receive, using a first microring resonant cavity in the optical add/drop multiplexer, a first optical network signal transmitted by a first waveguide in an optical network, where the first microring resonant cavity is coupled with a first side of the first waveguide, a wavelength of the first optical network signal is a first wavelength, and a transmission direction of the first optical network signal in the first waveguide is a first direction.

First, the first optical network signal is transmitted in the first waveguide 301, the transmission direction of the first optical network signal is the first direction, and the first direction is a specified transmission direction in which the optical add/drop multiplexer should not perform processing, that is, the optical add/drop multiplexer should not extract an optical network signal transmitted in this direction.

A resonant wavelength of the first microring resonant cavity 302 is the first wavelength. Therefore, the first microring resonant cavity 302 can receive the first optical network signal in the first waveguide 301 in a coupling manner. However, the first microring resonant cavity 302 cannot receive an optical network signal that has another wavelength and that is transmitted in the first waveguide 301.

Step 702: Receive, using a first optical circulator in the optical add/drop multiplexer, the first optical network signal transmitted by the first microring resonant cavity using a second waveguide, where the first optical circulator is connected to one end of the second waveguide, and the other end of the second waveguide is coupled with the first microring resonant cavity.

After receiving the first optical network signal, the first microring resonant cavity 302 transmits the first optical network signal to the first optical circulator 305 using the second waveguide 304.

Step 703: Receive, using a second microring resonant cavity in the optical add/drop multiplexer, the first optical network signal transmitted by the first optical circulator using a third waveguide, where the first optical circulator is connected to one end of the third waveguide, the other end of the third waveguide is coupled with the second microring resonant cavity, and the first wavelength is a resonant wavelength of the first microring resonant cavity and the second microring resonant cavity.

After receiving the first optical network signal transmitted by the first microring resonant cavity 302, the first optical circulator 305 transmits the first optical network signal to the second microring resonant cavity 303 using the third waveguide 306. A wavelength of the second microring resonant cavity 303 is also the first wavelength. Therefore, the second microring resonant cavity 303 can receive the first optical network signal.

Step 704: Retransmit the first optical network signal to the first waveguide using the second microring resonant cavity, such that an optical network signal in the first direction is transmitted in the first waveguide.

After receiving the first optical network signal transmitted by the first optical circulator 305, the second microring resonant cavity 303 may retransmit the first optical network signal to the first waveguide 301 in a coupling manner, such that the first optical network signal may continue to be transmitted in the first waveguide 301 in the first direction. It can be learned that after passing through the optical add/drop multiplexer, an optical network signal that should not be processed by the optical add/drop multiplexer is not changed, and continues to be normally transmitted.

Step 705: Receive, using the second microring resonant cavity, a second optical network signal transmitted by the first waveguide, and transmit the second optical network signal to the first optical circulator using the third waveguide, where a wavelength of the second optical network signal is the first wavelength, a transmission direction of the second optical network signal in the first waveguide is a second direction, the second direction is a specified direction of a to-be-processed optical network signal transmitted in the first waveguide, and the second direction is opposite to the first direction.

In addition to transmitting an optical network signal in the first direction, the first waveguide 301 may transmit an optical network signal in the second direction opposite to the first direction. For example, the second optical network signal that has a same wavelength as the first wavelength is transmitted in the first waveguide 301, and the transmission direction of the second optical network signal in the first waveguide 301 is the second direction.

Step 706: Receive, using the first optical circulator, the second optical network signal transmitted by the second microring resonant cavity, and transmit the second optical network signal to a second optical circulator in the optical add/drop multiplexer.

Step 707: Receive, using the second optical circulator, the second optical network signal transmitted by the first optical circulator, and extract and distribute, using a fifth waveguide connected to a first end of the second optical circulator, the second optical network signal to an optical network node on which the optical add/drop multiplexer is located, where a third end of the second optical circulator is connected to one end of a fourth waveguide, and the other end of the fourth waveguide is connected to a third end of the first optical circulator.

Step 701 to step 704 describe a process of filtering an optical network signal (a process that, after going out from the first waveguide 301, the first optical network signal reenters the first waveguide 301 by passing through the first microring resonant cavity 302, the second waveguide 304, the first optical circulator 305, the third waveguide 306, and the second microring resonant cavity 303, which is referred to as filtration of an optical network signal), and step 705 to step 707 describe a process of extracting an optical network signal.

If step 701 to step 704 are considered as a whole process, and step 705 to step 707 are considered as a whole process, the two whole processes may be executed in any sequence, which is not limited by step numbers. That is, in this embodiment of the present disclosure, two processes of an extraction of a signal and filtration of a signal may be simultaneously performed, or may be performed in any sequence, and do not interfere with each other.

The second direction is a specified transmission direction of a signal that needs to be processed. Therefore, if a wavelength of an optical network signal transmitted in this direction is the same as a wavelength of a microring resonant cavity in the optical add/drop multiplexer, the optical network signal needs to be locally extracted, that is, extracted and distributed to the optical network node on which the optical add/drop multiplexer is located.

First, the second optical network signal is transmitted using the first waveguide 301, and the transmission direction of the second optical network signal is the second direction. The second microring resonant cavity 303 receives, in a coupling manner, the second optical network signal transmitted in the first waveguide 301, and may transmit the second optical network signal to the first optical circulator 305 using the third waveguide 306. After receiving the second optical network signal, the first optical circulator 305 transmits the second optical network signal to the second optical circulator 308 using the fourth waveguide 307. After receiving the second optical network signal, the second optical circulator 308 extracts the second optical network signal locally using the fifth waveguide 309. Therefore, an extraction of the signal is completed.

Figure 8:
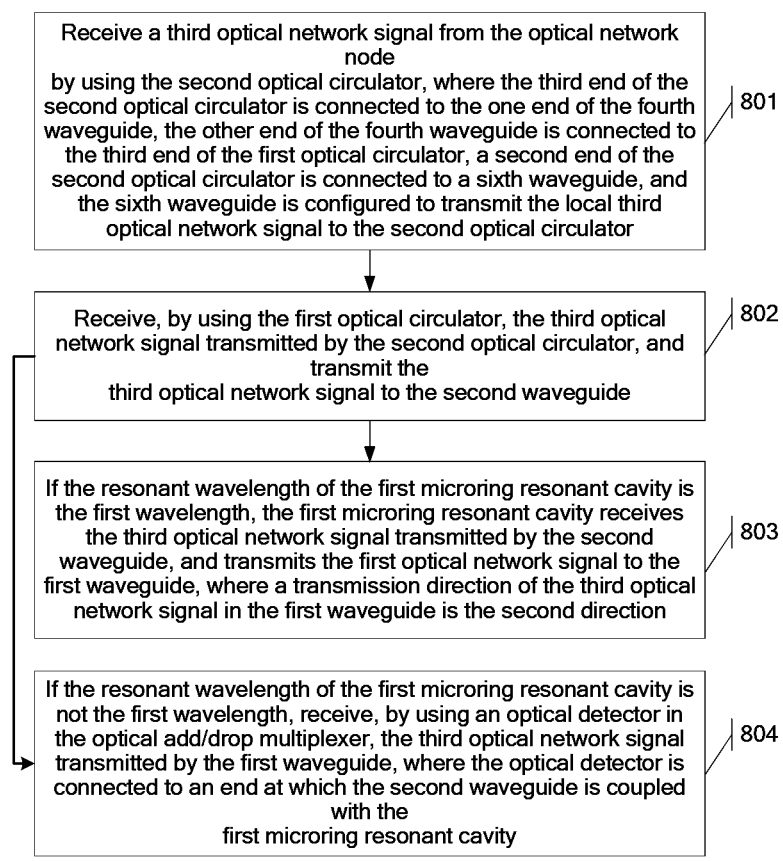
FIG. 8 is a flowchart of a method for inserting an optical network signal into an optical network according to an embodiment of the present disclosure.

Optionally, referring to FIG. 8, in this embodiment of the present disclosure, the method further includes:

Step 801: Receive a third optical network signal from the optical network node using the second optical circulator, where the third end of the second optical circulator is connected to the one end of the fourth waveguide, the other end of the fourth waveguide is connected to the third end of the first optical circulator, a second end of the second optical circulator is connected to a sixth waveguide, and the sixth waveguide is configured to transmit the local third optical network signal to the second optical circulator.

Step 802: Receive, using the first optical circulator, the third optical network signal transmitted by the second optical circulator, and transmit the third optical network signal to the second waveguide. If the resonant wavelength of the first microring resonant cavity is the first wavelength, step 803 is performed; or if the resonant wavelength of the first microring resonant cavity is not the first wavelength, step 804 is performed.

Step 803: If the resonant wavelength of the first microring resonant cavity is the first wavelength, the first microring resonant cavity receives the third optical network signal transmitted by the second waveguide, and transmits the first optical network signal to the first waveguide, where a transmission direction of the third optical network signal in the first waveguide is the second direction.

Steps 801 to 803 describe an insertion process of a signal, that is, an optical network signal in the optical network node is inserted into the optical network. When an insertion of a signal is to be performed, the to-be-inserted third optical network signal is received using the sixth waveguide 401, and the third optical network signal is transmitted to the second optical circulator 308; after receiving the third optical network signal, the second optical circulator 308 transmits the third optical network signal to the first optical circulator 305 using the fourth waveguide 307; after the first optical circulator 305 receives the third optical network signal, if the resonant wavelength of the first microring resonant cavity 302 does not deviate from the first wavelength, the first optical circulator 305 may transmit the third optical network signal to the first microring resonant cavity 302 using the second waveguide 304, and the first microring resonant cavity 302 transmits the third optical network signal to the first waveguide 301 in a coupling manner. Therefore, the insertion of the signal is completed.

In this embodiment of the present disclosure, processes of an extraction of a signal, filtration of a signal, and an insertion of a signal may be simultaneously performed, or may be performed in any sequence, and do not interfere with each other.

Optionally, in this embodiment of the present disclosure, during an insertion of a signal, after the transmitting the third optical network signal to the second waveguide 304, the method may further include:

Step 804: If the resonant wavelength of the first microring resonant cavity is not the first wavelength, receive, using an optical detector in the optical add/drop multiplexer, the third optical network signal transmitted by the first waveguide, where the optical detector is connected to an end at which the second waveguide is coupled with the first microring resonant cavity.

That is, if the resonant wavelength of the first microring resonant cavity 302 deviates from the first wavelength, the first microring resonant cavity 302 cannot normally receive the third optical network signal that should be inserted, and the third optical network signal is incident into the optical detector 501. Therefore, the resonant wavelength of the first microring resonant cavity 302 may be adjusted using a thermo-optic effect. When light detected by the optical detector 501 is reduced to zero, the resonant wavelength of the first microring resonant cavity 302 is adjusted to a proper resonant wavelength.

In conclusion, this embodiment of the present disclosure provides an optical add/drop multiplexer, including: a first microring resonant cavity 302, coupled with a first side of a first waveguide 301 in an optical network, and configured to receive, from the first waveguide 301, a first optical network signal whose wavelength is a first wavelength; a second microring resonant cavity 303, coupled with the first side of the first waveguide 301, and configured to receive the first optical network signal transmitted by the first microring resonant cavity 302, and transmit the first optical network signal to the first waveguide 301, where a transmission direction of the first optical network signal in the first waveguide 301 is a first direction; and configured to receive, from the first waveguide 301, a second optical network signal whose wavelength is the first wavelength and whose transmission direction in the first waveguide 301 is a second direction, where the first wavelength is a resonant wavelength of the first microring resonant cavity 302 and the second microring resonant cavity 303, the second direction is a specified direction of a to-be-processed optical network signal transmitted in the first waveguide 301, and the second direction is opposite to the first direction; a first optical circulator 305, where a first end a of the first optical circulator 305 is connected to one end of a second waveguide 304, and a second end b of the first optical circulator 305 is connected to one end of a third waveguide 306; configured to transmit, to the second microring resonant cavity 303, the first optical network signal transmitted by the first microring resonant cavity 302, and to receive the second optical network signal transmitted by the second microring resonant cavity 303, where the other end of the second waveguide 304 is coupled with the first microring resonant cavity 302, and the other end of the third waveguide 306 is coupled with the second microring resonant cavity 303; and a second optical circulator 308, where a third end f of the second optical circulator 308 is connected to a third end c of the first optical circulator 305 using a fourth waveguide 307, and a first end d of the second optical circulator 308 is connected to one end of a fifth waveguide 309; configured to receive the second optical network signal transmitted by the first optical circulator 305, and extract and distribute, using the fifth waveguide 309, the second optical network signal to an optical network node on which the optical add/drop multiplexer is located.

In this embodiment of the present disclosure, the second direction is a specified transmission direction of a to-be-processed optical network signal, that is, the optical add/drop multiplexer needs to insert or extract an optical network signal transmitted in the second direction. However, for an optical network signal in the first direction, normal transmission should be ensured. Specifically, if optical network signals transmitted in the first direction have a first optical network signal whose wavelength is the first wavelength, the first microring resonant cavity 302 receives the first optical network signal from the first waveguide 301, and transmits the first optical network signal to the second microring resonant cavity 303 using the first optical circulator 305; the second microring resonant cavity 303 retransmits the first optical network signal to the first waveguide 301 in a coupling manner, and the first optical network signal continues to be transmitted in the first waveguide 301 in the first direction. However, if optical network signals transmitted in the second direction have a second optical network signal whose wavelength is the first wavelength, the second microring resonant cavity 303 receives the second optical network signal, and extracts and distributes, using the second optical circulator 308 and the first optical circulator 305, the second optical network signal to the optical network node on which the optical add/drop multiplexer is located. That is, after passing through the optical add/drop multiplexer, an optical network signal in the first direction is not extracted, and can be still normally transmitted; however, an optical network signal in the second direction can be extracted and distributed to the optical network node, thereby ensuring not only normal extraction operation of the optical add/drop multiplexer but also that when inserting or extracting an optical signal in one direction, the optical add/drop multiplexer can support normal transmission of an optical signal in the other direction, such that all optical network signals transmitted in two directions can be properly processed, so as to ensure normal optical communication.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the embodiments of the present application essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

The foregoing embodiments are merely used to describe the technical solutions of the embodiments of the present application. The foregoing embodiments are merely intended to help understand the method and core idea of the embodiments of the present disclosure, and shall not be construed as a limitation on the embodiments of the present disclosure. Any variation or replacement readily figured out by a person skilled in the art within the technical scope disclosed in the embodiments of the present disclosure shall fall within the protection scope of the embodiments of the present disclosure.

What is claimed is:

1. An optical add/drop multiplexer located on an optical network node, the optical add/drop multiplexer comprising:
a first microring resonant cavity coupled with a first side of a first waveguide in an optical network, and configured to receive, from the first waveguide, a first optical network signal whose wavelength is a first wavelength;

a second microring resonant cavity coupled with the first side of the first waveguide, and configured to
receive the first optical network signal transmitted by the first microring resonant cavity, and transmit the first optical network signal to the first waveguide, wherein a transmission direction of the first optical network signal in the first waveguide is a first direction; and
receive, from the first waveguide, a second optical network signal whose wavelength is the first wavelength and whose transmission direction in the first waveguide is a second direction, wherein the first wavelength is a resonant wavelength of the first microring resonant cavity and the second microring resonant cavity, and the second direction is opposite to the first direction;
a first optical circulator having a first end is connected to one end of a second waveguide, and a second end connected to one end of a third waveguide, and the first optical circulator is configured to transmit to the second microring resonant cavity the first optical network signal transmitted by the first microring resonant cavity, and to receive the second optical network signal transmitted by the second microring resonant cavity, wherein the other end of the second waveguide is coupled with the first microring resonant cavity and the other end of the third waveguide is coupled with the second microring resonant cavity; and
a second optical circulator having a third end connected to a third end of the first optical circulator using a fourth waveguide, and a first end connected to one end of a fifth waveguide, and the second optical circulator is configured to receive the second optical network signal transmitted by the first optical circulator, and extract and distribute, using the fifth waveguide, the second optical network signal to the optical network node.

2. The optical add/drop multiplexer according to claim 1, wherein the optical add/drop multiplexer further comprises:
a sixth waveguide connected to a second end of the second optical circulator, and configured to transmit to the second optical circulator a third optical network signal that is to be inserted into the first waveguide and whose wavelength is the first wavelength;
the second optical circulator is further configured to receive the third optical network signal from the sixth waveguide, and transmit the third optical network signal to the first optical circulator;
the first optical circulator is further configured to receive the third optical network signal transmitted by the second optical circulator, and transmit the third optical network signal to the first microring resonant cavity using the second waveguide; and
the first microring resonant cavity is further configured to receive the third optical network signal transmitted by the first optical circulator, and transmit the third optical network signal to the first waveguide, wherein a transmission direction of the third optical network signal in the first waveguide is the second direction.

3. The optical add/drop multiplexer according to claim 1, wherein the optical add/drop multiplexer further comprises:
an optical detector connected to an end at which the second waveguide is coupled with the first microring resonant cavity, and configured to receive an optical network signal that is from the second optical circulator and whose wavelength is the first wavelength, when the resonant wavelength of the first microring resonant cavity deviates from the first wavelength.

4. The optical add/drop multiplexer according to claim 3, wherein the optical detector is a photomultiplier, a pyroelectric detector, or a semiconductor optical detector.

5. The optical add/drop multiplexer according to claim 3, wherein the optical detector is a pyroelectric detector.

6. The optical add/drop multiplexer according to claim 3, wherein the optical detector is a semiconductor optical detector.

7. The optical add/drop multiplexer according to claim 1, wherein there are multiple first microring resonant cavities and
(a) the multiple first microring resonant cavities are arranged in a column, whose ends are separately coupled,
(b) a first microring resonant cavity arranged in a first place of the column is coupled with a first side of the first waveguide, and
(c) a first microring resonant cavity arranged in a last place of the column is coupled with the second waveguide.

8. The optical add/drop multiplexer according to claim 1, wherein there are multiple second microring resonant cavities and
g) the multiple second microring resonant cavities are arranged in a column, whose ends are separately coupled,
b) a second microring resonant cavity arranged in a first place of the column is coupled with the first side of the first waveguide, and
c) a second microring resonant cavity arranged in a last place of the column is coupled with the third waveguide.

9. The optical add/drop multiplexer according to claim 1, wherein the optical network is a wavelength division multiplexing (WDM) optical network.

10. An optical network signal transmission method comprising:
receiving, by a first microring resonant cavity in an optical add/drop multiplexer, a first optical network signal transmitted by a first waveguide in an optical network, wherein the first microring resonant cavity is coupled with a first side of the first waveguide, a wavelength of the first optical network signal is a first wavelength, and a transmission direction of the first optical network signal in the first waveguide is a first direction;
receiving, by a first optical circulator in the optical add/drop multiplexer, the first optical network signal transmitted by the first microring resonant cavity using a second waveguide, wherein the first optical circulator is connected to one end of the second waveguide, and the other end of the second waveguide is coupled with the first microring resonant cavity;
receiving, by a second microring resonant cavity in the optical add/drop multiplexer, the first optical network signal transmitted by the first optical circulator using a third waveguide, wherein the first optical circulator is connected to one end of the third waveguide, the other end of the third waveguide is coupled with the second microring resonant cavity, and the first wavelength is a resonant wavelength of the first microring resonant cavity and the second microring resonant cavity;
retransmitting the first optical network signal to the first waveguide using the second microring resonant cavity, such that an optical network signal in the first direction is transmitted in the first waveguide;
receiving, by the second microring resonant cavity, a second optical network signal transmitted by the first waveguide, and transmitting the second optical network signal to the first optical circulator using the third waveguide, wherein a wavelength of the second optical network signal is the first wavelength, a transmission direction of the second optical network signal in the first waveguide is a second direction, and the second direction is opposite to the first direction;

receiving, by the first optical circulator, the second optical network signal transmitted by the second microring resonant cavity, and transmitting the second optical network signal to a second optical circulator in the optical add/drop multiplexer; and receiving, by the second optical circulator, the second optical network signal transmitted by the first optical circulator, and extracting and distributing, using a fifth waveguide connected to a first end of the second optical circulator, the second optical network signal to an optical network node on which the optical add/drop multiplexer is located, wherein a third end of the second optical circulator is connected to one end of a fourth waveguide, and the other end of the fourth waveguide is connected to a third end of the first optical circulator.

11. The method according to claim 10, wherein the method further comprises:

receiving a third optical network signal from the optical network node by the second optical circulator, wherein the third end of the second optical circulator is connected to the one end of the fourth waveguide, the other end of the fourth waveguide is connected to the third end of the first optical circulator, a second end of the second optical circulator is connected to a sixth waveguide, and the sixth waveguide is configured to transmit the local third optical network signal to the second optical circulator;

receiving, by the first optical circulator, the third optical network signal transmitted by the second optical circulator, and transmitting the third optical network signal to the second waveguide; and receiving, by the first microring resonant cavity, the third optical network signal transmitted by the second waveguide when a resonant wavelength of the first microring resonant cavity is the first wavelength, and transmitting the first optical network signal to the first waveguide, wherein a transmission direction of the third optical network signal in the first waveguide is the second direction.

12. The method according to claim 11, wherein after the transmitting the third optical network signal to the second waveguide, the method further comprises:

receiving, using an optical detector in the optical add/drop multiplexer, the third optical network signal transmitted by the first waveguide when the resonant wavelength of the first microring resonant cavity is not the first wavelength, wherein the optical detector is connected to an end at which the second waveguide is coupled with the first microring resonant cavity.

* * * * *

UNITED STATES PATENT AND TRADEMARK OFFICE
CERTIFICATE OF CORRECTION

PATENT NO. : 10,063,338 B2
APPLICATION NO. : 15/582290
DATED : August 28, 2018
INVENTOR(S) : Wenxiong Wei Page 1 of 1

It is certified that error appears in the above-identified patent and that said Letters Patent is hereby corrected as shown below:

In the Claims

Claim 8, Column 20, Line 24, "g)" should read -- a) --

Signed and Sealed this
Thirtieth Day of July, 2019

Andrei Iancu
*Director of the United States Patent and Trademark Office*